(12) United States Patent
Sinclair et al.

(10) Patent No.: US 7,451,127 B2
(45) Date of Patent: Nov. 11, 2008

(54) WEB STORE EVENTS

(75) Inventors: Andrew Sinclair, Redmond, WA (US); Bruce Gage, Renton, WA (US); In-Jerne Choe, Lynwood, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 11/040,341

(22) Filed: Jan. 21, 2005

(65) Prior Publication Data

US 2005/0131862 A1    Jun. 16, 2005

Related U.S. Application Data

(63) Continuation of application No. 09/680,119, filed on Oct. 4, 2000, now Pat. No. 6,876,995.

(51) Int. Cl.
*G06F 17/30* (2006.01)
(52) U.S. Cl. .......................................................... 707/2
(58) Field of Classification Search ...................... 707/2, 707/3, 104.1
See application file for complete search history.

(56) References Cited

U.S. PATENT DOCUMENTS

| | | | |
|---|---|---|---|
| 5,530,848 A | 6/1996 | Gilbert | |
| 5,721,828 A | 2/1998 | Frisch | |
| 5,732,219 A | 3/1998 | Blumer et al. | |
| 5,838,969 A | 11/1998 | Jacklin et al. | |
| 6,065,046 A | 5/2000 | Feinberg et al. | |
| 6,876,995 B1 * | 4/2005 | Sinclair et al. ................. | 707/2 |
| 7,082,475 B2 | 7/2006 | Haverstock et al. | |
| 2005/0108264 A1 | 5/2005 | Sinclair | |

OTHER PUBLICATIONS

Notice of Allowance for related U.S. Appl. No. 10/997,463 mailed Feb. 13, 2008.

* cited by examiner

*Primary Examiner*—Etienne P LeRoux
(74) *Attorney, Agent, or Firm*—Workman Nydegger

(57) ABSTRACT

Systems and methods for web store events. A web store event occurs whenever an item is accessed. When an item is accessed, both synchronous and asynchronous events can fire. If a synchronous event fires, then an event object that has registered for the synchronous event is called and executed before the transaction involving the item is allowed to complete. The synchronous event also has the ability to either commit or abort the transaction. Importantly, the synchronous event has complete control over the item. An asynchronous event is called and executed after the transaction involving the item is already committed to the store and after any synchronous events have executed. Because more than one event object can register for a web store event, synchronous event objects are called according to their priority. Synchronous events fire before asynchronous events and synchronous event objects execute before asynchronous event objects.

6 Claims, 3 Drawing Sheets

WEB STORE EVENTS

CROSS-REFERENCE TO RELATED APPLICATIONS

The present application is a continuation application of commonly-assigned U.S. patent application Ser. No. 09/680,119 filed Oct. 4, 2000, also entitled "Web Store Events", which is incorporated herein by reference.

BACKGROUND OF THE INVENTION

1. The Field of the Invention

The present invention relates to systems and methods for storing, sharing and managing data. More particularly, the present invention relates to systems and methods for events occurring within a data store.

2. Background and Relevant Art

Computer networks are becoming increasingly important in part because they allow computers to interconnect and interact. The interconnection and interaction provided by networked computers has simplified many tasks and enables people to work together more efficiently. For example, a Local Area Network (LAN) allows users to communicate quickly and efficiently by sending electronic messages to all of the other users connected with the LAN. The Internet is another example of a network that allows users to send messages to other users connected with the Internet.

Another advantage provided by computer networks is that data can be stored in a manner that makes it available to all of the computers connected to the network storing the data. In most networks, the data is typically managed by server computers. Because there are different types of data that may be stored on a computer network, a computer network often has a server that is responsible for electronic messages (emails), a server that is responsible for documents, and yet another server managing Web pages.

Even though all of the data is available to users over the computer network, access to specific data is strongly related to the client that is accessing the stored data. More specifically, many data stores are designed to interact with specific clients or in accordance with a particular protocol. For example, server computers that make data accessible over the Internet typically interact with clients that comply with Hyper Text Transfer Protocol (HTTP) requests, while a server computer making mail data available over a LAN will interact with clients that use Mail Application Programming Interface (MAPI) requests. More generally, a particular data store is only available to known or defined clients. For this reason, users that desire to execute application logic whenever a client accesses the data store must implement and write that logic for each type of client. The application logic must comply with the protocol of both the client and the data store's server. As newer clients are added to the computer network, rewriting the application logic for each different type of client is a formidable task. A change to the application logic must be made to each separate version of the application logic. In addition, all of these client specific applications can consume valuable disk space and reduce bandwidth.

The proliferation of different and new client types is beginning to compromise the ability of a data store to meet the needs of those clients. Mobile telephones, personal digital assistants (PDAs), and other clients are beginning to provide users with the ability to access those data stores over different types of networks. Because the application logic is written for each different type of client, it is difficult to expand the capabilities and functions of a data store.

Another problem associated with application logic is that the data store is often accessed before the application logic can execute. For example, if an application desires to index a document, that document is first saved to the data store. However, it is possible for that document to be changed or accessed by another client before the application logic can execute. In another example, emails are often stored to the data store before they can be analyzed for viruses. In this situation, it is possible for that email to be opened before the application logic can scan that email. In this case, the repercussions can be tragic if the email does in fact have a virus. Current data stores do not have the ability to suspend a transaction within the data store, such as saving an email to the data store, while application logic executes. The functionality of existing data stores cannot be dynamically extended upon the occurrence of a condition or activity within the data store.

BRIEF SUMMARY OF THE INVENTION

A web store is a data store that provides, for example, the functionality and features of a file system, the Internet and a server. The web store typically provides a single repository for content including electronic messages, documents, Web pages, and other resources. The present invention provides systems and methods through which the functionality of the web store can be enhanced. When an access of the web store occurs by a client, an event is fired. When an event fires, application logic is called an executed in response to the event.

An event is the occurrence of a condition at the web store or activity within the web store, which is often referred to as the event source. Exemplary events include saving an item to the web store and deleting an item from the web store. When the conditions defining the event occur, an event is fired. If the event is a synchronous event, control of the item that triggered the event is given to an event object. The event object is application logic that performs some function. When the event object has finished executing, the transaction initiated by the client's access of the store is either committed or aborted and control of the item is given back to the web store.

For example, if the event is saving an item to the web store, then the event object could be application logic that checks the item to be saved in the web store for viruses before the item is saved within the web store. If a virus is found, the transaction that caused the event to fire is aborted and the item is not saved in the web store. If the event is not aborted, then the transaction is completed and the item is committed to the store. An asynchronous event, on the other hand, is fired after the event condition has occurred. Additionally, the item has already been committed to the store when an asynchronous event fires. Because the item has already been committed to the store, the event object associated with the asynchronous event does not receive exclusive control over the item that caused the asynchronous event.

Event objects should register with the web store in order to receive notification of the events when the events occur. The registration of an event object can be to the entire web store or specific to a portion of the web store. Some event objects, for example, may choose to register with a particular folder. After an event object is registered, the event object is called each time the conditions defining the event occur. Events allow the application logic of the event object to be independent of the client that is accessing the store. This provides the significant advantage of only having to write the event object a single time. In addition, the event object will execute regardless of whether the client is connected when the item arrives at the web store or whether the client has the particular application installed.

Another advantage provided by events is that applications can be developed to extend and customize the functionality of the web store. Event objects, which embody these types of applications, allow users to increase their productivity and work more efficiently because the event objects can be tailored to the needs of the users. Functions such as workflow, data validation, property promotion, and electronic messaging processing are examples of applications that can be accomplished through the use of events.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
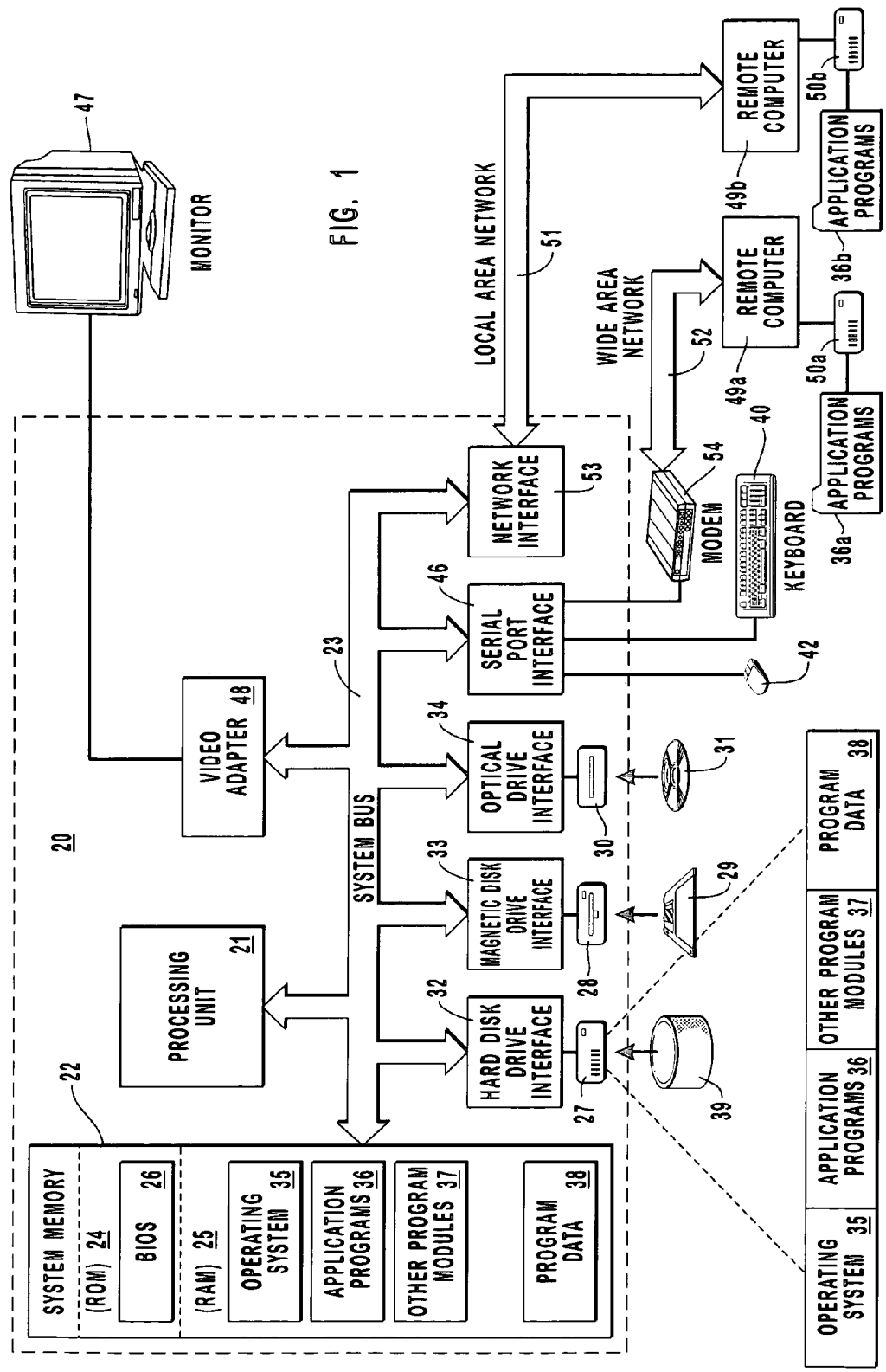
FIG. 1 illustrates an exemplary system that provides a suitable operating environment for the present invention.

The present invention provides systems and methods for store events. The use of store events allows applications to execute logic or code whenever a store event occurs. A store event typically occurs when an item is saved, deleted, moved, copied, or modified within a data store. Store events also occur when a database such as a mail database (MBD) is started or stopped and when a specific time interval has elapsed. It is understood that the actions specified herein are examples of events and are not to be construed as limiting the conditions or actions that constitute events.

As used herein, "event source" refers to the process that generated the event. More generally, the event source is the data store. An "event object" refers to the application logic that implements an interface to service the event. A "synchronous event source" calls event objects as the events occur within the store and an "asynchronous event source" calls event objects after the events have occurred within the store.

Store events allow applications to program specific actions to occur on the occurrence of particular conditions within the data store. Synchronous events permit event objects to execute before an item is committed to the data store. As a result, synchronous event objects are capable of canceling a transaction related to the item. Asynchronous events are called after an item has been committed to the store. Usually, asynchronous events are used when the actions performed by the asynchronous event object do not directly affect the item.

The present invention further extends to both methods and systems for implementing store events. The present invention also extends to both methods and systems for expanding the functionality of a data store. The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
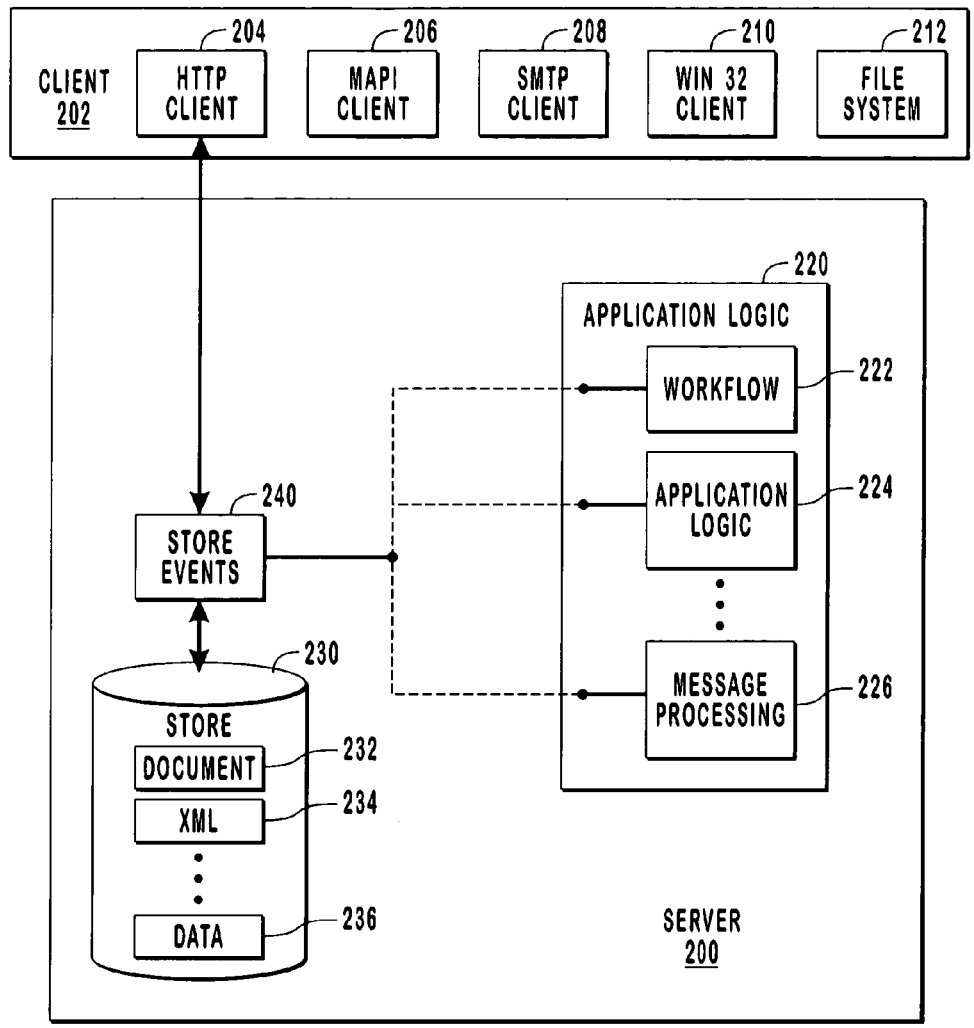
FIG. 2 illustrates an exemplary system including a server and one or more clients in which events are used to expand the functionality of the store by calling application logic that will execute on items being committed to the store.

FIG. 2 is a block diagram illustrating a system in which the present invention may be implemented. Generally, FIG. 2 illustrates a client 202 that is communicating with a server 200. The connection between the client 202 and the server 200 can be over the Internet, a local area network, a wide area network, or other system that allows communication between the client 202 and the server 200. The client 202 is representative of exemplary clients including, but not limited to, a Hyper Text Transfer Protocol (HTTP) client 204, a Mail Applications Programming Interface (MAPI) client 206, a Simple Mail Transfer Protocol (SMTP) client 208, a Win 32 client 210, and a file system client 212. Each of the clients represented by the client 202 may communicate with the server 200 using a particular protocol and each client does not necessarily communicate with the server 200 over the same network as the other clients.

Additionally, the systems and methods of the present invention exist and can operate independent of whether the client 202 is actually connected with the server 200 or the store 230. This is significant because the execution of the application logic 220, as described in more detail below, is dependent on the occurrence of certain conditions within the store 230 rather than the availability of a particular client.

In FIG. 2, the client 202 is accessing a store 230 of the server 200. The store 230 may be implemented as a database and is capable of storing, sharing, and managing data. The store 230 may be organized as a hierarchy of folders or directories and each folder can contain other folders. From the viewpoint of the client 202, each item in the store 230 is accessible using a Uniform Resource Locator (URL). If the client is the file system 212 or other similar client, then each item in the store is accessible using a drive (m:\, for example) because the store 230 may be mapped to a file system. The items or data in the store 230 include, but are not limited to, documents 232, Extensible Markup Language (XML) data 234, electronic messages including emails, Web content, multimedia data, word processing documents, and the like. Because the store 230 is able to store many different types of data, it is more simple to find and use the data. The store 230 supports offline access, remote client access and serves as a platform for unified messaging.

The store events 240 are closely related to the store 230. Store events 240 are the occurrence of some activity or action within the store 230. The store events 240 can also be the occurrence of some activity or action within a folder or directory of the store 230 or the occurrence of some activity or action within a file system of the store 230, or the like. For example, the store events 240 are often triggered or fired whenever an item is saved, deleted, moved, copied; or modified within the store 230. Store events 240 also fire when a mail database is started or stopped or when a timer expires. As used herein, "access" refers to the activities that occur or that may occur within a store 230 as described above. As a result, a store event is fired when the store 230 is accessed.

The server 200 further includes the application logic 220. The application logic 220 is often implemented as an object conforming with the Component Object Model (COM) architecture. COM objects provide the advantage of being able to perform the processing required by the client 202. COM objects can also be executed over a network and are not required to reside on the server 200. Each COM object is typically associated with one or more store events and the COM objects executed upon the occurrence of a store event are referred to herein as event objects.

Event object 222 is an example of a workflow object. Event object 224 is a general example of application logic and event object 226 is an example of an object that performs message processing. While the application logic 220 is described in terms of COM objects, the implementation of the application logic 220 is not limited to COM objects. The application logic 220 may also be implemented, for example, in script.

When the client 202 accesses the store 230, the store events 240 cause an event to fire or trigger. As will be described in more detail below, an event will cause the application logic 220 that has registered for the event to execute with regard to the item that the client 202 was accessing. If the item was an electronic message such as an email, then the event object 226, which processes electronic messages, will be called and executed.

For example, many electronic messages can be classified as junk messages and the event object 226 can be designed to filter the electronic messages against a contact list as well as a list of advertisers. If the electronic messages are from an advertiser, then the event object 226 can simply delete the electronic messages and the electronic messages will not be committed to the mail database in the store 230. Alternatively, the event object 226 can cause the electronic messages to be directed to a particular folder within mail database of the store 230. Significantly, the store events 240 allow the functionality of the store 230 to be extended and enhanced through the use of the application logic 220.

In another example, the event object 224 can be called by the store events 240 when a document is accessed within the store 230. Accessing the document causes the store events 240 to signal an event, which causes the appropriate event object to be executed. The event object 224 can be programmed to scan the document for certain key words and create an index of the document or other function. More generally, the application logic 220 can be designed to accomplish a wide variety of purposes and enhance the functionality of the store 230.

Another advantage of the store events 240 is that the store events 240 are independent of the client 202. This is significant because each client that accesses the store 230 typically has a different protocol or method of connecting with the server 200 and in the absence of the store events 240, each event object would have to be written multiple times to accommodate each separate client. The store events 240 allow the application code to be abstracted from the clients such that the application logic 220 will execute regardless of which client accesses the store 230. In fact, it is not necessary for the client 202 to be connected with the server 200 in order for the event object to be executed.

For example, a client may send a document to the store 230 to be saved. Before the document physically arrives at the store 230, the client may disconnect from the network connecting the client to the server. However, the event object will still execute on that document because the event will fire when an attempt is made to save the document to the store. In other words, the condition that defines this event is saving the document to the store. Upon the occurrence of this condition, an event is triggered or fired and an event object is called.

As previously described, the store events 240 are closely associated with the store 230. Because the store 230 is often arranged in a folder hierarchy, each folder within the store 230 can be associated with different store events. For example, the store events associated or assigned to a particular folder can cause an event to fire when at item is saved to that folder while the store events associated with another folder may only cause events to be fired or triggered when an item is deleted from that folder.

Figure 3:
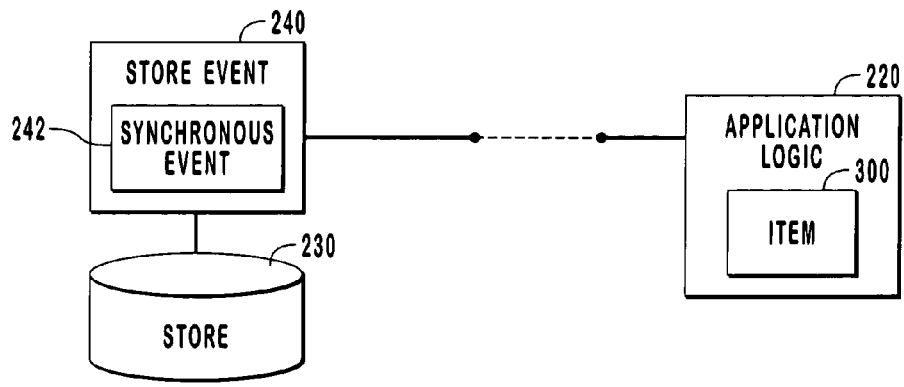
FIG. 3 is a block diagram illustrating a synchronous event fired in response to the occurrence of an event at the data store.

Events can be either synchronous or asynchronous. FIG. 3 is a block diagram that illustrates synchronous events. The application logic 220 or event object called by an event is executed in a different process with respect to the event source, which protects the server from exceptions and faults generated by the application logic 220.

When a client accesses the store 230, a synchronous event 242 is fired by the store events 240. The synchronous event 242 effectively causes the application logic 220 to operate or execute before an item is committed to the store 230. For example, when an item is saved to the store 230, a save event may be fired and if the application logic 220 has registered for the save event, then the application logic 220 is called and executed. If the event is a synchronous event, the application logic 220 has complete control of the item 300 as illustrated in FIG. 3. Complete control is accomplished by either providing the actual item to the application logic 220 or by providing the application logic 220 with a pointer to the item or the like. As a result, the synchronous event 242 is capable of modifying the item 300 before it is committed to the store 230 or of preventing the item 300 from being committed to the store 230. For example, if a synchronous save event is aborted, then the transaction of saving the item to the store will not be performed and the item is therefore not committed to the store. Similarly, if synchronous delete event is aborted, then the transaction of deleting the item from the store will not be performed and the item is therefore not committed to the store.

When a synchronous event fires, the application logic 220 is called and executed before the condition occurring at the store 230 is allowed to complete. The application logic 220 can therefore modify the item 300 before the client 202 can access the item 300 and often operates before the client 202 is aware of the item 300. In one example, the item 300 does not exist in the store 230 until the transaction is committed after the application logic 220 executes.

Synchronous events occur in the context of a local transaction. The application logic (also referred to as an event sink) is called twice. The first time the application logic is called, the application logic is executed before the action or condition that triggered the event. The second time the application logic is called, the condition that triggered the event is either allowed to complete or aborted.

Figure 4:
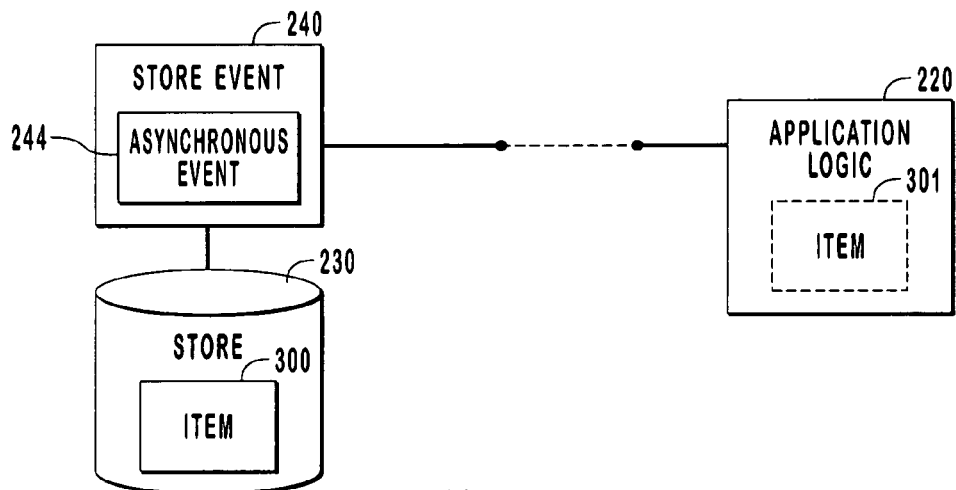
FIG. 4 is a block diagram illustrating an asynchronous event fired in response to the occurrence of an event at the data store.

FIG. 4 is a block diagram that illustrates asynchronous events. An asynchronous event executes after a particular operation or condition has already occurred and the item has been committed to the store. Asynchronous events cannot abort the operation, but the application logic registered for the asynchronous event is notified that the event has occurred. In comparison, the application logic registered for a synchronous event is notified before or concurrently with the operation on the item. As further illustrated in FIG. 4, the application logic 220 does not have complete control over the item 300 because the item 300 has already been committed to the store 230. Rather, the application logic 220 obtains an image or copy of the item 300, which is shown as item 301.

Figure 5:
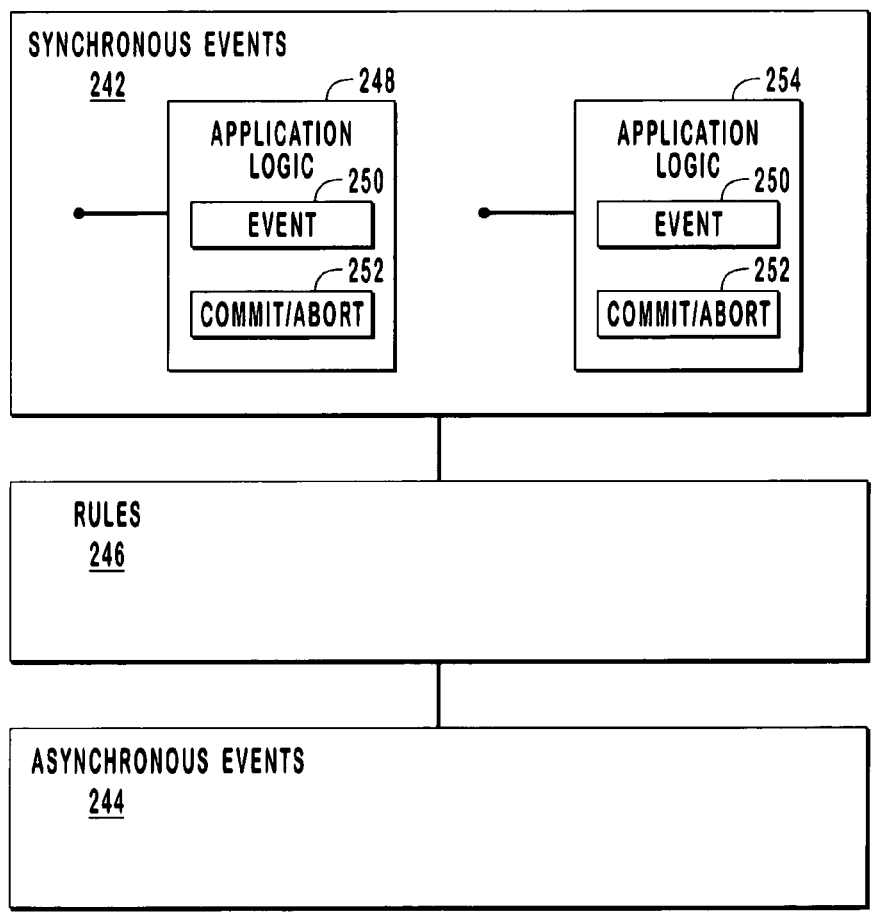
FIG. 5 depicts both the order in which synchronous events and asynchronous events fire and the priority between multiple synchronous events.

FIG. 5 illustrates the order in which events fire. Synchronous events 242 fire first, rules 246 operate second, and asynchronous events 244 fire last. With regard to the synchronous events 242, it is possible for more than one event object to register for the same event. In this case, the synchronous events are executed according to a priority. In FIG. 5, the application logic 248 has a higher priority than the application logic 254.

As previously stated, each application logic is called at least twice. For example, the application code 248 is called first for the event 250 and second to either commit or abort the item to the store. The application logic 254 is similarly called after the application logic 248 commits the item to the store, at which point control of the item is given to the application logic 254. In some instances when an event object aborts the event, the event source will not pass the item to the next event object in the priority list. Alternatively, the remaining event objects are notified that an event object aborted.

Synchronous events are usually guaranteed to call all of the event objects that have registered for the synchronous events. After all of the synchronous events have operated, the rules 246 are performed. For example, many applications that store electronic messages have rules that operate on the electronic messages. These rules operate after the synchronous events and before the asynchronous events. Finally, the asynchronous events 224 fire and are guaranteed to call their event objects at least once.

The following example illustrates how web store events can be used to expand and enhance the web store. In general, a workflow ensures that documents are routed to the appropriate persons at appropriate times. Using web store events, this process can be used to properly forward the documents and is independent of the clients that receive the documents. When the document is saved to the store, an event fires, and an event object determines who should receive the document next. The event object then proceeds to email the document to the next user. That user returns the document to the store in an email attachment. When the email arrives at the store another event is fired and the event object determines that the attachment is the document. The document is retrieved from the email and sent to the next person in accordance with the programming of the event object.

In this manner, web store events can support workflows and can be used for virus scanners, content indexing, messaging system rules, and the like. Web store events can also be used for notification purposes, categorization of data, item validation, and store maintenance. Events can also be tied to timers. When a timer or time period expires, an event can fire and an external event object can be executed. Timed events are often used to synchronize information external to the data store, perform maintenance on the store, sent reminders to identified users, perform batch processing, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer program product for use in a system including a server having a store, wherein one or more clients have access to the store using a plurality of different protocols, the computer program product comprising:
one or more computer-readable physical storage media storing computer-executable instructions for implementing a method of executing application logic upon client access of an item within the store, wherein the method includes:
registering the application logic with one or more store events that abstract the plurality of different protocols from the application logic such that client communication using any of the plurality of different protocols can cause the application logic to execute;
firing an event that the application logic registered with in response to the client access to the item in store;
if the fired event is a synchronous event, then
suspending client access to the item;
providing complete control of the item to the application logic, wherein the application logic executes; and
if the application logic does not abort, resuming client access to the item and committing the item to the store;
if the fired event is an asynchronous event, then committing the item to the store; and
calling the application logic, wherein the application logic does not have complete control of the item.

2. A computer program product as defined in claim 1, wherein the fired event is one or more of, saving the item, deleting the item, copying the item, moving the item, modifying the item, starting a mail database, stopping a mail database, and an expiration of a timer within the store.

3. A computer program product as defined in claim 1, wherein the step of firing the event comprises at least one of the steps for:
saving the item within the store by the client;
deleting the item within the store by the client;
copying the item within the store by the client;
moving the item within the store by the client; and
modifying the item within the store by the client.

4. A computer program product as defined in claim 1, wherein the step of registering further comprises the step for registering the application logic with one or more store events that abstract the plurality of different protocols from the application logic and are related to at least one folder of the store.

5. A computer program product as defined in claim 1, wherein the step of providing complete control of the item to the application logic further comprises the steps for providing the item to the application logic and committing the item to the store after the application logic operates on the item.

6. A computer program product as defined in claim 1, wherein the step for firing the event does not require the client to be connected with the server.

* * * * *

UNITED STATES PATENT AND TRADEMARK OFFICE
CERTIFICATE OF CORRECTION

| | | |
|---|---|---|
| PATENT NO. | : 7,451,127 B2 | Page 1 of 1 |
| APPLICATION NO. | : 11/040341 | |
| DATED | : November 11, 2008 | |
| INVENTOR(S) | : Andrew Sinclair et al. | |

It is certified that error appears in the above-identified patent and that said Letters Patent is hereby corrected as shown below:

In column 8, line 43, before "synchronous" insert -- a --.

Signed and Sealed this
Twenty-sixth Day of April, 2011

David J. Kappos
*Director of the United States Patent and Trademark Office*